United States Patent [19]
Gritisch et al.

[11] 3,723,959
[45] Mar. 27, 1973

[54] APPARATUS FOR INDICATING ACOUSTICAL OR ELECTROMAGNETIC SIGNALS

[75] Inventors: Herbert Gritsch, Achim; Herwig Meyerhoff, Bremen; Enno Bruns, Bremen; Gerd Hemmie, Bremen, all of Germany

[73] Assignee: Fried. Krupp Gesellschaft mit beschrankter Haftung, Essen, Germany.

[22] Filed: Nov. 16, 1970

[21] Appl. No.: 89,693

[52] U.S. Cl. .................... 340/6 R, 340/3 C, 343/118
[51] Int. Cl. ............................................. G01s 3/00
[58] Field of Search ..340/3 C, 6 R, 16 R, 3 D, 3 FM; 315/22; 343/5 SA, 118

[56] References Cited

UNITED STATES PATENTS

| | | | |
|---|---|---|---|
| 3,060,427 | 10/1962 | Jaffe et al. | 343/118 |
| 3,374,670 | 3/1968 | Maeder | 343/118 X |
| 3,462,729 | 8/1969 | Papineau et al. | 340/6 R |
| 3,484,647 | 12/1969 | McGuinness | 315/22 |
| 3,602,877 | 8/1971 | Currie et al. | 340/6 R |

*Primary Examiner*—Richard A. Farley
*Attorney*—Spencer & Kaye

[57] ABSTRACT

An improved apparatus for providing a polar coordinate indication at an image frequency which produces still pictures, e.g. on a cathode-ray tube, of a scanning function $A = g(x)$ furnished by an electronic scanner by scanning received acoustical or electromagnetic signals, e.g. from sonar or radar system, wherein $A$ is the signal intensity and the independent variable $x$ is the angle of incidence $\phi$; the frequency for some other parameter of the received signal, wherein the independent variable $x$ is indicated by the angular deflection of the indication and the signal intensity $A$ is represented by the radial deflection of the indication. Various alternative types of representations of the scanning function utilizing this scheme are provided. According to one type of representation the course or shape of the scanning function curve may be indicated with respect to a zero reference circle, preferably with the area beneath the curve also indicated or brightened in the case of a cathode-ray tube indicating device. According to a further type of representation the maximum values of all or selected scanned signals are determined and indicated as radial lines or spokes. Apparatus is also provided for simultaneously presenting both of these types of indications or indications representing different types of scanning functions in different sectors of the image field of the polar indication.

23 Claims, 12 Drawing Figures

Patented March 27, 1973 3,723,959

INVENTORS.
Herbert Gritsch
Herwig Meyerhoff
Enno Bruns
Gerd Hemmie

BY *Spencer & Kaye*
ATTORNEYS.

Patented March 27, 1973

INVENTORS.
Herbert Gritsch
Herwig Meyerhoff
Enno Bruns
Gerd Hemmie

BY *Spencer & Kaye*
ATTORNEYS.

INVENTORS.
Herbert Gritsch
Herwig Meyerhoff
Enno Bruns
Gerd Hemmie

BY Spencer & Kaye
ATTORNEYS.

APPARATUS FOR INDICATING ACOUSTICAL OR ELECTROMAGNETIC SIGNALS

BACKGROUND OF THE INVENTION

The present invention relates to an apparatus for indicating a scanning function $A = g(x)$ furnished by an electronic scanner from received acoustical or electromagnetic signals, e.g. in a sonar or a radar system, wherein $A$ is the signal intensity and the independent variable $x$ is the direction of incidence $\phi$, the frequency $f$ or some other signal parameter. The function is plotted on the indicator in polar coordinates at an image frequency which produces still pictures. The generation of such a scanning function is disclosed in the copending U.S. Patent application Ser. No. 784,962 filed Aug. 5, 1968 by W. Schwarz et al. and now U.S. Pat. No. 3,568,141.

In known indicator devices for providing polar coordinate indications, the acoustic or electromagnetic signals are indicated by dot-shaped brightening of the image points on the screen of a cathode-ray tube with the brightness of the image points being a measure of the intensity of the signals. This manner of representing the signal intensity information is, however, often unsatisfactory because the limited brightness dynamic causes difficulties in differentiating between error or interference indications and desired or useful indications.

SUMMARY OF THE INVENTION

It is, therefore, the object of the present invention to provide an apparatus of the type mentioned above for indicating a scanning function which assures an indication in polar coordinates with a more defined indication dynamic as regards signal intensity than the prior art indicates and thus a clearer indication of the signal intensity.

In solving this problem the present invention is based on the realization that the signal intensity in the representation of the polar coordinates need not be indicated or not only indicated by degrees of brightness in dot-shaped indications, but rather may be indicated by lines or distances, in order to facilitate the evaluation of the signal indication in the polar coordinate picture. Based on this consideration, the present invention provides the indicating device with a deflecting arrangement which provides for both an angular and a radial deflection for the indication in a manner so that the angular deflection is associated with the indication of the independent variable $x$ and the radial deflection is associated with the indication of the signal intensity $A$, thus providing for the indication of the signal intensity by radial distances in the polar coordinate picture. The indication of the signal intensity in this manner leads to signal indications of greater clarity and differentiability and permits more dependable conclusions about the character of the signal sources being observed, particularly if such conclusions are required in connection with additional information about the distance.

A particularly descriptive picture of the scanning function $A = G(x)$ can be obtained according to the invention by indicating the signal intensities $A$ by distances with reference to a zero reference circle, with the distances indicated either as extending outwardly or inwardly from the zero reference circle, i.e., either toward or away from the origin of the polar coordinate indication. The image field of the polar coordinate indication may also be divided according to a feature of the invention into several concentric ring zones to increase readability, which ring zones are associated with signal indications of different information. For example, the different ring zones may serve to give separate indications of different types of scanning functions, e.g. the scanning function $A = g(\phi)$ and the scanning function $A = g(f)$, or to give different type indications of one or a plurality of scanning functions.

According to one embodiment of the invention, circuit means are provided for indicating the course or shape of the scanning function $A = g(x)$ furnished by the electronic scanner. A particularly advantageous type of course indication is given, according to a further feature of the present invention, in that the circuit means causes the entire area below the curve path of the scanning function $A = g(x)$ to be indicated, i.e., brightened on the face of a cathode-ray tube. Such an indication makes it easier for the observer to interpret the pictured indication.

According to another embodiment of the invention, a maximum value filter as disclosed, for example, in U.S. Pat. No. 3,430,192 W.Schwarz, filed Nov. 13, 1967 and patented Feb. 25, 1969 is connected to the output of the scanner, only the maximum values of the scanning function $A_{max} = g(x)$ are indicated in the form of radial spokes or lines whose length represents the maximum signal intensity $A_{max}$.

According to still a further feature of the invention, an indicator device is used for the polar coordinate indication in which the image point is subjected to an angular and radial deflection according to a given time program and in which it is brightened or an indication provided when the signal intensity exceeds a threshold value signal. The threshold value signal is provided by a threshold value generator which is coupled with the radial deflecting circuit arrangement in such a manner that the threshold value is monotonically changed with the radial deflection. The deflecting circuit arrangement may here be designed in a known manner for circular image point deflection with a continuously or step-wise variable radius. With this arrangement, according to a further feature of the invention, the signal intensity can be indicated in the polar coordinate picture by radial distances at desired, if necessary variable, scale by providing a threshold value generator which provides a threshold value signal which varies according to the appropriate function over the radial deflection. The resulting signal intensity indication is preferably nonlinear, e.g. logarithmic.

Preferably, the apparatus according to the invention is provided with circuitry to provide a number of different types of representations of the signals and/or different types of scanning functions and is further provided with a selector switching arrangement to permit the selective indication of different scanning functions and/or different representations of the scanning functions. This allows the observer and evaluator of the picture indication to select that form of representation which is optimally adapted to the momentary environmental conditions in order to obtain a clear and rapid picture in which the characteristic informations are emphasized. Preferably, the selector switching arrangement is so constructed, that a directionally selective switching on of the scanning function $A = g(f)$ for selected signals, or sectors of the scanning function $A = g(\phi)$ is possible. For this purpose separate switches may be provided for different sectors of the direction of incidence $\phi$ which switch on that scanning function $A = g(f)$ which corresponds to a signal in the selector sector.

According to a further feature of the invention, indication can be improved by providing a marker generator for producing one or a plurality of preferably adjustable reference rings whose radii correspond to certain signal intensities. Additionally, according to a still further feature of the invention, an alarm generator may be provided which produces an alarm when a given signal intensity threshold value has been exceeded. It is advisable to couple this threshold with the generation of one of the above-mentioned reference rings so that the signal intensity threshold value causing the alarm can be optically indicated. It is also advisable to cut out certain selectable sectors from the alarm indication which correspond for example, to known signals which are not of particular interest and, if required, simultaneously identify these sectors by cutting them out from the reference rings produced by the mark generator.

DESCRIPTION OF THE PREFERRED EMBODIMENTS

Figure 1:
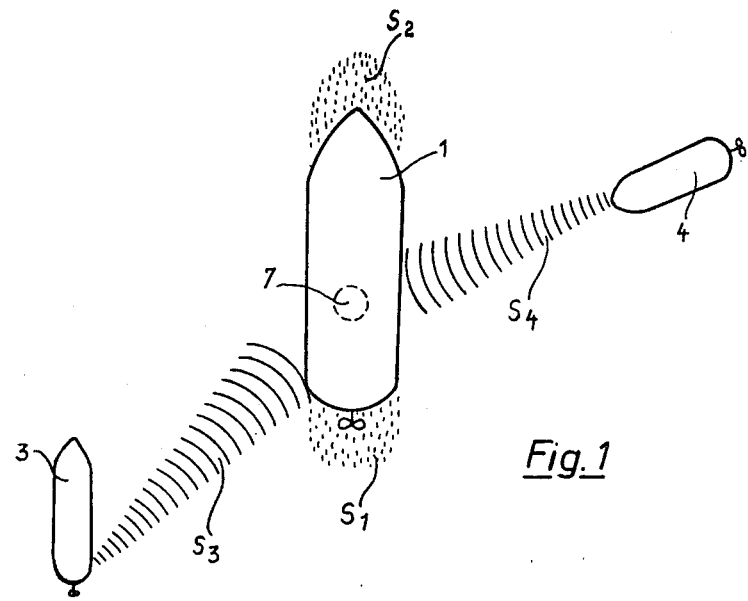
FIG. 1 is a schematic representation of a plurality of signal sources which is utilized in all embodiments to explain the signal indications.
Figures 2, 3, 4:
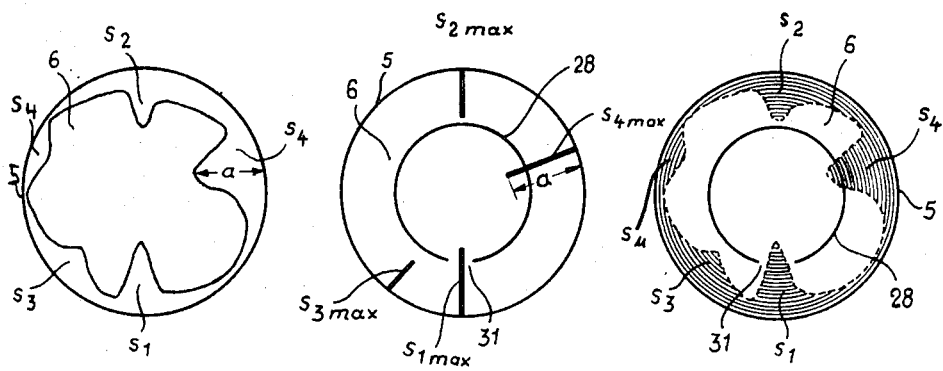
FIGS. 2 to 4 show different types of signal indications or representations according to the invention for the signal intensity and direction of impingement of the signals shown in FIG. 1.

Referring now to the figures, signals indications which are limited to an indication of the direction of incidence or impingement $\phi$ and the received signal intensity $A$ will first be discussed. FIG. 1 shows an exemplary situation where a sonar receiving system is installed on an observing vessel 1. The observing vessel 1 itself is assumed to generate a screw noise, i.e. signal $S_1$, as well as signal $S_2$ which is produced by the bow wave. In addition, the observing vessel 1 receives signal $S_3$ from the screw of an accompanying vessel 3 as well as signal $S_4$ from a further vessel 4. FIG. 2 shows one form of signal indications $S_i$, where $i = 1$ to 4, according to the present invention, for the situation according to FIG. 1. The received signals $S_i$, where $i = 1$ to 4, from the entire horizon result, according to their directions of impingement $\phi_i$ and their signal intensities $A_i$ in polar coordinates, in the signal indications $s_i$, with the signal intensities $A_i$ being indicated for each azimuth angle of the horizon as signal amplitudes or distances from a zero circle 5 toward the center or origin of the screen 6 of a cathode-ray tube 2. (FIG. 5) The significant signal indications in the illustrated presentation are $s_1$ to $s_4$ corresponding to received signals $S_1$ to $S_4$ of FIG. 1. Additionally, a weak signal from the general environment $S_u$ is also indicated which does not originate from a defined signal source in a defined direction. The indication in FIG. 2 represents the course or shape of the scanning function $A = g(\phi)$ over the entire horizon. Thus, for the situation illustrated in FIG. 1, the indication of the received signals $S_i$, which were obtained from scanning the horizon, when plotted over the zero circle 5 in the manner of FIG. 2 shows the following: signal $S_1$ from the screw of the observing vessel 1 is relatively strong, signal $S_2$ from the bow wave, however, is relatively weak, the signal $S_3$ originating from the accompanying vessel 3 is relatively weak, and the signal $S_4$ from a signal source of the further vessel 4 is very strong. Compared with the indications of these signals, which are defined as regards their directions of incidence $\phi_i$, the amplitude of the signal indication $s_u$ of the undefined environmental noise shows that its amplitude is clearly lower.

In the practical application of the sonar art conditions continuously change. Thus, an indication according to FIG. 2 is subjected to continuous changes, for example as regards amplitude of the signal indications $s_i$ or as regards the directions of incidence $\phi_i$. In order to be able to always obtain an optimal directional indication, i.e., the angle of incidence $\phi_i$ for defined received signals $S_i$, with continuously changing bases for the signal indications $S_i$ of FIG. 2, it is often advisable to indicate only the directions of incidence and the signal intensities of the maximum values of the received signals $S_i$ in the form of radial lines or spokes. Such a representation is shown in FIG. 3, wherein corresponding to the signal indications $s_i$ of FIG. 2, the signal indications here are $s_{1max}$, $s_{2max}$, $s_{3max}$, and $s_{4max}$. The signal indication $s_u$ of the general environmental noise has no defined maximum values, and thus leads to no indication in the manner of indicating as shown in FIG. 3. It is, therefore, always possible, even with strongly fluctuating directions of incidence as may result, for example, with superposed signals from further accompanying vessels or other signal sources, to indicate the accurate direction of incidence of the most important signals $S_i$, i.e. the strongest signals.

The signal indications or representations according to FIG. 4 are again similar to those of FIG. 2 except that the entire area under the curve path of the scanning function $A = g(\phi)$ is now indicated. This type of indication has also been found to be advantageous when compared with that of FIG. 2 when strong fluctuations of the direction of incidence $\phi_i$ and the signal intensities $A_i$ are present. Due to the brightly marked area beneath the curve this type of presentation, in spite of the fluctuating signal indications $s_i$ provides an image which is more distinct than that provided with the fluctuating narrowly bright-written curve path of FIG. 2.

The circuitry, for producing the signal indications according to FIGS. 2 to 4 will now be explained with the aid of the block circuit diagram of FIG. 5. The observing vessel 1 in this case is provided with a sonar receiving system having a cylindrical group 7 of individual sonal receivers. The latter are connected with a direction-forming delay network 8 which is designed for the directionally selective reception of signals $S_i$ according to the known method of "performed beams" (directional characteristics which are fixed as regard their direction, which are adjacent one another and overlapping one another). For example, 16 sectors each having an aperture angle of 22.5° may be formed by the delay network 8. The received signals are passed through signal preparation output stages 8.1 to 8.16, where they are rectified, smoothed and suitably dynamically deformed, to an interpolating electronic scanner 9 as described, for example, in detail in the above-mentioned U.S. Patent application Ser. No. 784,962 which is connected to the delay network 8. at the output of scanner 9, the scanning function $A = g(\phi)$ for all the individual performed beams produced by the delay network 8 is available. The area below this scanning function $A = g(\phi)$ which is recorded over a zero circle 5 is shown in FIG. 4. The curve path of the scanning function itself represents the outline of this area or the indication of FIG. 2.

According to the invention, in order to indicate the independent variable, in this case the direction of incidence $\phi$, in a polar coordinate manner according to FIG. 4 on the screen 6 of a cathode-ray tube 2, the electron beam is angularly deflected, while to indicate the signal intensity A for each azimuth angle the electron beam is radially deflected. The location of the zero circle 5 on the outer periphery of the indication and the indication of the signal amplitude from there inwardly toward the origin or center of the image field of the polar indication have the advantage that a larger circumference is available for the multitude of low amplitude signals to be indicated, such as for example the signal indications $s_u$ of the general environmental noises, whereas the strong signal amplitudes, which occur less frequently and thus require less room, can therefore, be indicated to extend radially inwardly from the zero circle 5. The indication of the signal intensities A thus occurs by means of lines or distances a (FIG. 2) starting at the circular zero reference line 5 and extending toward the center of the screen 6.

Figure 5:
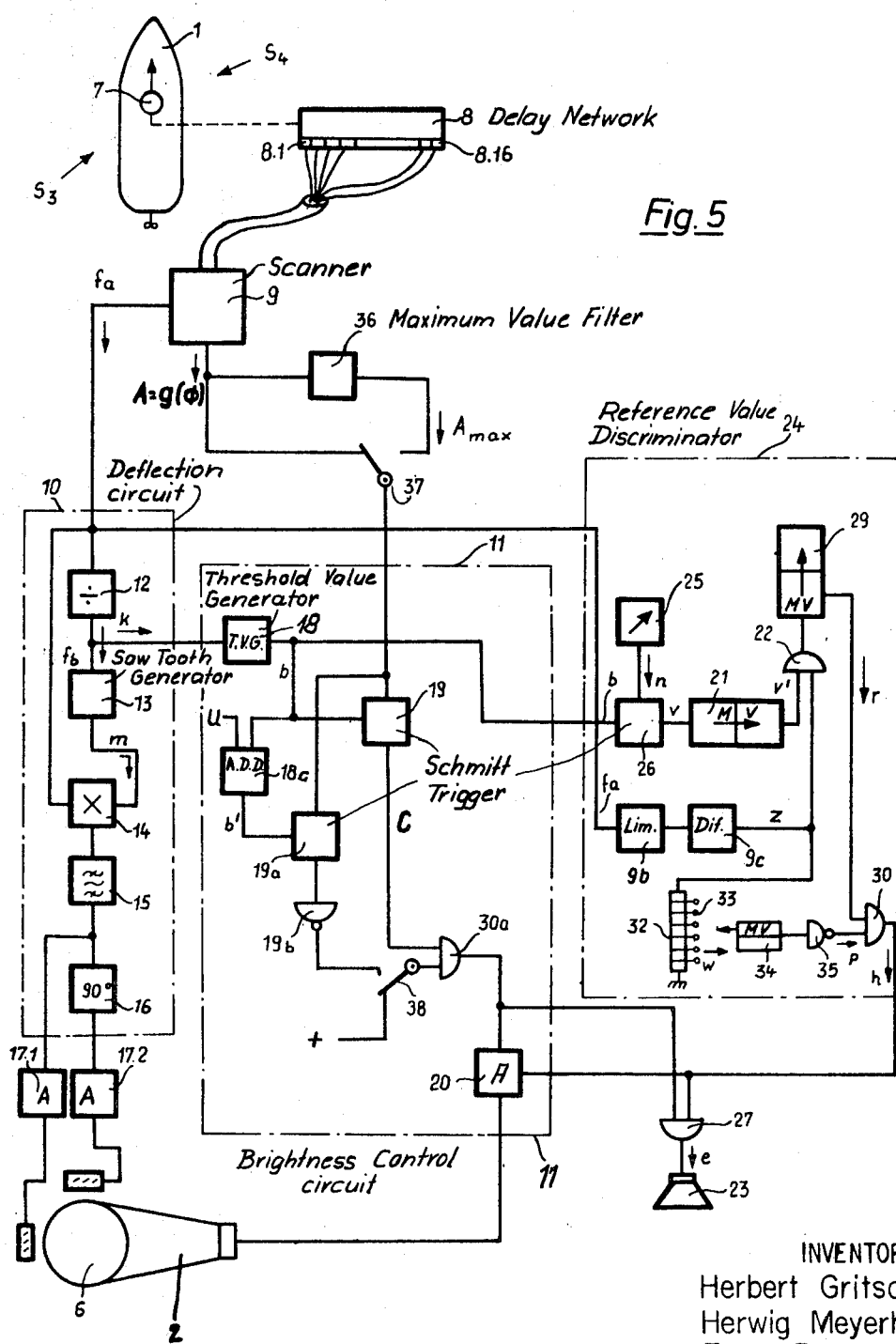
FIG. 5 is a block circuit diagram of an apparatus for producing the signal indications according to FIGS. 2 to 4.

In the circuit of FIG. 5, to effect the azimuthal and radial deflection of the electron beam, a deflection circuit is provided, whereas a special brightness control circuit 11 permits the indication of the scanning function $A = g(\phi)$ in the desired manner (i.e. according to FIG. 2, 3 or 4). To produce the spiral-shaped deflection pattern of the electron beam utilized in the illustrated embodiment of the invention, the scanning frequency $f_a = 1/T_a$ from the interpolating scanner 9 is fed to the deflection circuit 10 (see FIG. 6a) so that the scanning period $T_a$ also constitutes the decisive time unit for the indication on screen 6 of the cathode-ray tube 2, and the indication accurately corresponds, as regards the angular positions, to the scanning of the horizon by scanner 9. In the deflection circuit 10, the frequency $f_a$ is first reduced to an image frequency $f_b = 1/T_b$ in a frequency divider 12. The image period $T_b$ is selected to be as short as possible, i.e. short enough that a still picture results on the screen 6 of the cathode-ray tube 2 but not so short that the spiral pattern will be too coarse. Triggering pulses $k$ of the image frequency $f_b$ at the output of the frequency divider 12 actuate a sawtooth generator 13 whose output voltage represents a sweep voltage $m$ which increases in a sawtooth pattern and which, passes once from its minimum value to a maximum value within one image period $T_b$ and then begins with a minimum value at the beginning of the next triggering pulse $k$. This sweep voltage $m$ increasing in a sawtooth pattern is multiplied in a multiplier 14 with the scanning frequency $f_a$ from the scanner 9 and the product, in which the scanning frequency $f_a$ determines the circular deflection and the image frequency $f_b$ determines the radial deflection of the electron beam, is passed through bandpass filter 15 having a center frequency in the order of magnitude of the scanning frequency $f_a$. Two voltage components are derived from the output of the bandpass filter 15 with one of the components being shifted by 90° by means of a phase shifter 16. These two voltage components are fed to the horizontal and vertical deflection plates of the cathode-ray tube 2 via deflection amplifiers 17.1 and 17.2 to effect a spiral deflection of the electron beam from the center of the screen 6 toward the outer periphery.

The brightening of the electron beam which is circularly deflected at the timing of the scanning frequency $f_a$ and radially deflected at the timing of the image frequency $f_b$ is accomplished by the brightness control circuit 11. To produce an indication according to FIG. 4 and with the type of deflection provided by the deflection circuit 10, the brightening of the electron beam must occur as soon as it achieves the value of the signal intensity A for each azimuth angle. That is, starting from the center, the electron beam for a particular angular value is initially blocked, i.e., no brightness and therefore, no indication, and remains so until a deflection corresponding to the value of the signal intensity A occurs. Thereafter, the electron beam remains brightness controlled or unblocked at this angular value as it is deflected toward the zero reference circle 5. In order to assure this type of control, a threshold value generator 18 is provided at the input of the brightness control circuit 11 which is synchronized with the timing of the image period $T_b$, in that it is triggering by triggering pulses $k$ from the frequency divider 12 of the deflection circuit 10, and furnishes a threshold value voltage b having a sliding or decreasing threshold value approximately as shown in FIG. 6b. The criterion for brightening the electron beam to produce an indication on the screen 6 of the cathode-ray tube 2 is thus present when the signal amplitude, at a certain azimuth angle, i.e. corresponding to the direction of incidence $\phi$ of a signal intensity A of a received signal S, has reached the momentary threshold value $b$. Since the threshold value $b$ exhibits a descending path, once brightening or unblocking of the electron beam has occurred for a certain angular displacement, the electron beam will be bright from then on (assuming a constant signal intensity A) for this azimuth angle until it reached the zero circle 5. This is caused by the fact, as mentioned above, that the threshold value generator 18 is coupled with the deflection circuit 10 in such a manner that the threshold value $b$ monotonically decreases with increasing radial deflection of the electron beam, i.e. during the course of each image period $T_b$, as shown in FIG. 6b. The construction and dimensioning of the threshold value generator 18 effects a determination of the course and the maximum and minimum values of the threshold value voltage $b$. Although linear threshold value signals $b$ may be utilized, as shown in FIG. 6b, the discharge function of a capacitor is illustrated as a path for the threshold value $b$. Such a nonlinear path for the threshold value $b$ has advantages for the indication which will be discussed later.

The threshold value signal $b$ from threshold value generator 18 serves as a variable reference voltage for a Schmitt trigger 19 with which the signal intensity A at the output of scanner 9 is compared. The schematic illustration of FIG. 6c shows the signal intensities $A_3$ and $A_4$ of signals $S_3$ and $S_4$ of FIG. 1. The entire horizon of 360° is scanned several times during an image period $T_b$, with the electron beam being deflected from the center of screen 6 toward the outside. (The signals $S_1$ and $S_2$ are not considered in the illustration of FIG. 6c). A signal $c$ thus appears at the output of Schmitt trigger 19 only as long as the signal intensity A exceeds the reference voltage (i.e. the momentary threshold value $b$). The output pulses $c$ from the Schmitt trigger 19, which are the desired brightness control pulses, are fed to a video amplifier 20 whose output controls the brightness of the electron beam of tube 2. As can be seen from the density of the brightness control pulses $c$ in FIG. 6d, the electron beam is bright-written almost during the entire sweep thus the outer edge of the indication appears as a bright surface on the face 6 of cathode-ray tube 6 in the vicinity of the zero circle 5 as shown by the shaded area in FIG. 4.

Figure 6:
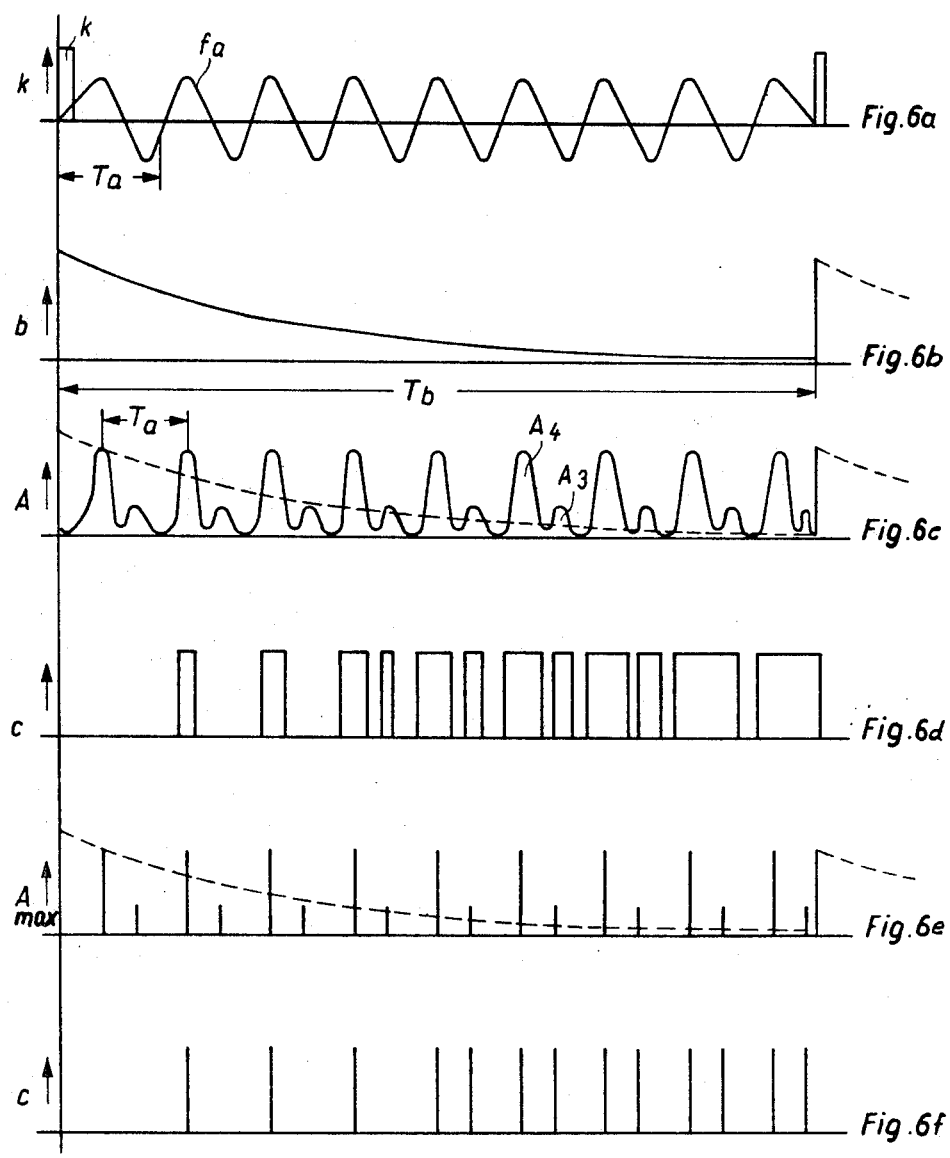
FIG. 6 shows pulse diagrams utilized to explain the operation of the apparatus according to FIG. 5.

For better clarity FIG. 6 shows the relationship of the scanning frequency $f_a = 1/T_a$ to the image frequency $f_b = 1/T_b$ possible to operate, for example, with a scanning frequency in the order of magnitude of 4 kHz and an image frequency of approximately 20 Hz. Additionally, in FIG. 6, the representation of the two signal intensities $A_3$ and $A_4$ is also distorted in order to better show the conditions for the brightness control of the electron beam. The stronger signal $S_4$ is recorded corresponding to the higher amplitude of the signal intensity $A_4$, as shown in FIGS. 6c and 6d, at an earlier time in image period $T_b$, which corresponds in the illustration of FIG. 4 to a location which is closer to the center of the screen 6, than is shown for signal $S_3$.

The chronological course of the threshold value $b$ which dies out during each image period $T_b$ determines the relationship between the signal intensity A at the output of the scanner 9 and the length of the distance or path $a$ in the signal indication $s$, measured from the zero circle 5 to the center of the screen 6 of the cathode-ray tube 2, by which the signal intensity A is indicated. If, as shown in FIG. 6b, the threshold value signal $b$ preferably has the course of the discharge curve of a capacitor, the distance $a$ will be proportional to the logarithm of the signal intensity A. Such a logarithmic indicator measure is known to permit a large dynamic in the production of measuring values. In the present case the selection of a threshold value signal $b$ having such a course has the additional advantage that the majority of the information is reproduced in the vicinity of the zero circle 5, i.e. particularly in a region of the screen 6 which encloses a large area. As can be seen in FIG. 6c, all signal intensities A exceed the value of threshold value signal $b$ this area. In the center of the screen 6, however, where there is less room, only particularly strong signal intensities A are indicated since only very rarely is the threshold vale signal $b$, which at the beginning of each image period $T_b$ is high, exceeded by signal intensities A.

According to a desirable feature of the invention, an alarm generator 23 is provided which is actuated when a critical threshold value $b$ is exceeded by the signal intensity A. In order to actuate the alarm, a reference value discriminator 24, having a further threshold value generator, hereinafter called reference value generator 25, and a Schmitt trigger 26, is provided. The generator 25 provides an output signal, i.e. the reference value $n$ corresponding to the desired permanently settable critical threshold value $b$ at which alarms are to be actuated. The Schmitt trigger 26 acts as a comparator for comparing the permanently settable reference value $n$ from the reference value generator 25 and the variable threshold value $b$ from the threshold value generator 18. When decreasing threshold value signal $b$ becomse less than the given reference value $n$, the Schmitt trigger 26 emits a pulse $v$ which in turn causes a reference pulse $h$ to appear at the output of the reference value discriminator 24. This reference pulse $h$ is fed to the first input of an AND gate 27 to whose second input is fed the brightness control pulse $c$ from the output of the Schmitt trigger 19. Thus, whenever a brightness control pulse $c$ and a reference pulse $h$ appear simultaneously at respective inputs of the AND gate 27, it emits an alarm pulse $e$ which actuates the alarm generator 23.

In the preferred illustrated embodiment of the invention, the reference value discriminator 24 is simultaneously used as a marker generator in order to produce one or a plurality of reference rings 28 on the screen 6 which correspond to certain given signal intensities A. It is advantageous to utilize the same reference pulse $h$ which serves to actuate the alarm generator 23 for producing the reference ring 28 in order to be able to immediately determine when glancing at the indication on the cathode-ray tube 2 which signal indication $s$ has initiated the alarm i.e. from which direction the critical signal S is coming.

To produce the reference ring 28, the reference pulse $h$ is given the duration of one scanning period $T_a$. It is also advisable to firmly synchronize the starting point of the reference ring 28 with the scanning frequency $f_a$. For this purpose synchronizing pulses $z$ are produced by means of limiter 9b and differentiating member 9c, which pulses mark the zero passages of $f_a$ and whose duration is short compared with $T_a$. From the comparison voltage $v$ at the output of Schmitt trigger comparator 26 a pulse $v'$ is produced in a monostable multivibrator 21 whose duration is set by the parameters of the multivibrator 21 and whose starting time is given by the instant when the threshold value $b$ falls below reference value $n$. Pulses $v'$ and $z$ are fed to the two respective inputs of an AND gate 22 whose output controls a further monostable multivibrator 29 which furnishes a brightening pulse $r$ of the duration of one scanning period $T_1$, and from which the reference pulse $h$ is derived and fed to a second input of the video amplifier 20. Thus the image point of the electron beam is bright-scanned during exactly 1 revolution of its spiral deflection and due to the small increase in the spiral deflection the impression of a circular reference ring 28 is obtained. The radius of this ring can thus be set by varying the reference value $n$ of the reference value generator 25. Obviously, although only means for generating one ring 28 is illustrated, additional rings may or may not represent critical threshold values which may be generated by the addition of additional similar circuitry.

It may be desirable to suppress an alarm under certain circumstances, for example, when the signal sources are known to the observer, such as the sounds of the screws from the observing vessel 1 or from an accompanying vessel 3. This can be accomplished in that the reference pulse $h$ for that angular range in which the signal indication $s$ for such a known signal source is disposed is suppressed. For this purpose, AND gate 30 is provided whose output provides the reference pulse $h$ and to whose inputs are fed a pulse derived from the comparison pulse $v$ and a gap pulse $p$. To generate the gap pulse $p$, the synchronizing pulses $z$ derived from scanner 9 are fed as triggering pulses $w$ via a selector logic circuit 32, for example, in the form of a delay line with selectable access points or taps 33, to the input of a monostable multivibrator 34 which provides an output pulse $p$ whose duration corresponds to the adjustable switching period $T_L$ of the monostable multivibrator 34. The output pulse of multivibrator 34, is then inverted in an inverting stage 35, to form the gap pulse $p$ and fed to the second input of the AND gate 30. Thus the pulse applied at the first input of AND gate 30 is blocked during the period the gap pulse $p$ is present, resulting in a reference pulse $h$ with a sector of the desired position and width left out. The beginning of the left-out sector can be set by properly selecting the connection to the tap 33, and the width of the sector 31 can be set by adjusting the switching time $T_L$.

If, as described above, the reference pulse $h$ is utilized for the alarm as well as for producing the reference ring 28, the described elimination of certain sectors results not only in a suppression of the alarm for signal indications S within this angular range, but also for an optical indication of this angular range by a gap in reference ring 28, such a gap in the reference ring 28 is indicated by the reference numeral 31 in FIGS. 3 and 4 for the sector corresponding to the signal indication $s_1$. The strong signal $S_1$ can thus not actuate an alarm, whereas signal $S_4$ leads to the initiation of an alarm because its maximum in the illustrated examples has reached the reference value $n$ required for initiation of the alarm, in this case reference ring 28.

If, to facilitate the determination of the direction of interesting signals and eliminating the other information, the signal indication of FIG. 4 is to be changed to a signal indication according to FIG. 3 in which only the signal intensities A of the distinct maxima of the signal indication of FIG. 4 and their associated directions of incidence $\phi$ appear in the indication, the above-described circuit of FIG. 5 must be supplemented with a maximum value filter 36, as described for example, in detail in the above-mentioned publication, which provides narrow or needle-shaped pulse corresponding to the maxima. The scanning function $A = g(\phi)$ is then switched, via a switch 37, not directly to the Schmitt trigger 19 as in the previously described embodiment but rather via the filter 36 so that the function $A_{max} = g(\phi)$ is fed to the Schmitt trigger 19. As shown in FIG. 6e, the needle-shaped pulses corresponding to the maxima are compared with the threshold value signal $b$ during each image period $T_b$ in the Schmitt trigger 19 which provides spike or needle-shaped output pulses (FIG. 6f) as soon as an input signal thereto exceeds the momentary value of the threshold value $b$. On the screen 6 of the cathode-ray tube 2, corresponding strip-shaped light streaks appear which extend, corresponding with the signal intensity A, from the zero circle 5 to the center of the screen 6, i.e. in the form of spokes. The signal indication thus does not consist, as in FIG. 4, of the signal indications $s_t$, but of the signal indications $s_{tmax}$. The remaining circuit according to FIG. 5 has the same significance for this type of indication as was previously described. Here, too, an alarm is possible and a settable reference ring 28 can be provided. This results in a further advantage for the spoke or strip-shaped indication because the left-out sector 31 can be made much smaller than was the case in a representation according to FIG. 4. Particularly, with strongly fluctuating indications with weak maxima, this may be of advantage since, for example, the noise from the screw of the observing vessel 1 always comes directly from behind, and can thus be accurately eliminated, whereas an interesting signal which is closely adjacent and which perhaps also comes from almost directly behind might still actuate the alarm.

If it is desired to record only the curve path of the scanning function $A = g(\phi)$ relative the zero circle 5 on the screen 6 of the cathode-ray tube 2, as this is shown in FIG. 2, a further switch 38 is provided with which the second input of an AND gate 30a, which in the previously described operational cases was continuously set, can be switched to the output of an inverting gate 19b. This inverting gate 19b is controlled by a second Schmitt trigger 19a which is identical to Schmitt trigger 19. Both have as their input signal the scanning function $A = g(\phi)$. As a reference for the Schmitt trigger 19a a constant voltage U, whose magnitude is very small compared with the maximum value of $b$, is added in an adder 18c to the threshold value $b$ to provide a threshold value signal $b'$. The video amplifier 20 can thus be controlled only when the signal intensity A has exceeded threshold $b$ and not threshold $b'$, i.e. the width of the curve train in the indication of FIG. 2 can be set by the variable voltage U. For the representation of an indication according to FIG. 2, the Schmitt trigger 19 is directly connected with scanner 9 through switch 37. If switch 37 were to switch in the maximum filter 36, instead of the curve train of FIG. 2, only the most inward point of the spoke-shaped signal indications $s_{imax}$ according to FIG. 3 would appear, a type of indication, which may be justified in special cases. The generation of a reference ring 28 and the other circuitry of FIG. 5 remain unchanged for the indication according to FIG. 2.

Figures 7, 9:
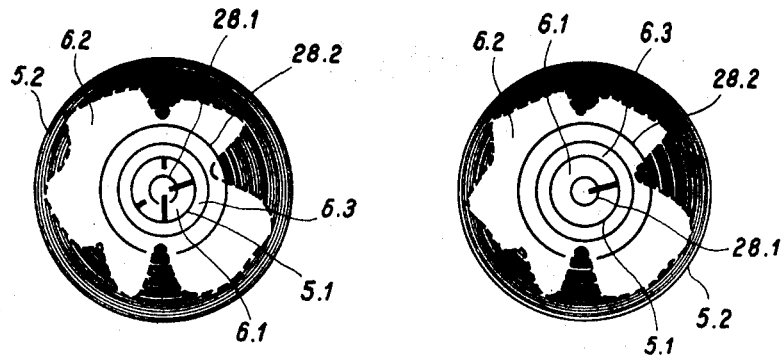
FIG. 7 shows the combination according to the invention of an indication according to FIG. 3 with that according to FIG. 4.
FIG. 9 shows a modification of the indication according to FIG. 7 for emphasizing pulse-shaped signals.
Figure 8:
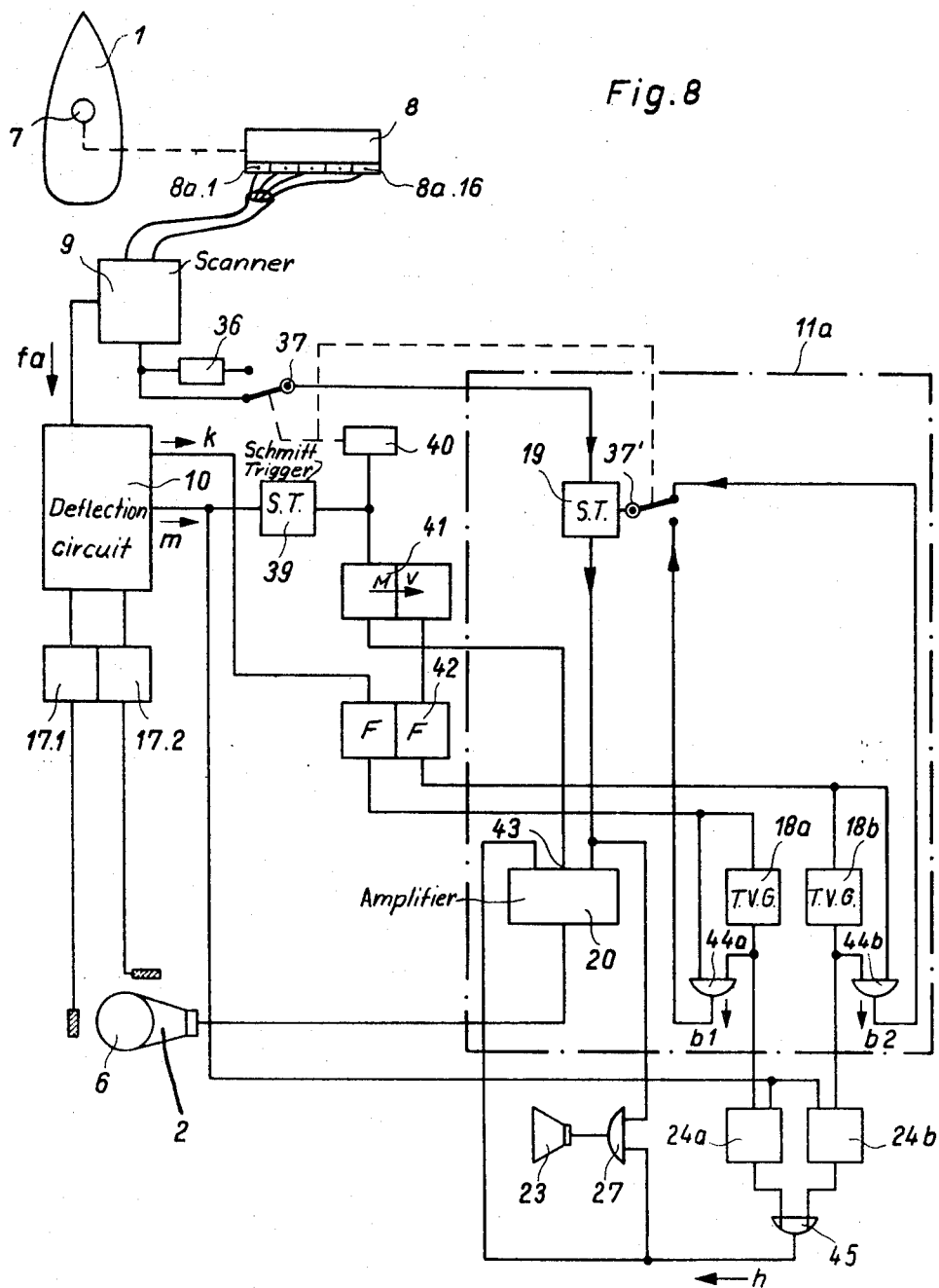
FIG. 8 illustrates a modification of the apparatus of FIG. 5 in order to produce an indication according to FIG. 7.

FIG. 7 shows a type of indication in which the indications of FIG. 4 and FIG. 3 are combined so that each individual indication has its own separate associated zone on the screen 6 of the cathode-ray tube. To produce such a combined indication the circuit diagram of FIG. 5 is supplemented as shown in FIG. 8. This circuit is so designed that during one image period $T_b$ to spoke-type indication of FIG. 3 is switched to an areal indication according to FIG. 4. This is accomplished in that as soon as the sawtooth-shaped sweep voltage $m$ of the sawtooth generator has reached a given limit value in deflection circuit 10, the circuit according to FIG. 8 switches from the scanning function $A = g(\phi)$ to the scanning function $A_{max} = g(\phi)$. For this purpose an additional Schmitt trigger 39 is provided whose output signal leads to a control device 40 for switch 37 and to a monostable multivibrator 41 which acts as a pulse delay device for the input of a bistable multivibrator 42. The other input of the bistable multivibrator 42 is controlled by trigger pulses $k$ from the deflection circuit 10. The two switching states of the bistable multivibrator 42 determine the time intervals in which the two scanning functions $A = g(\phi)$ and $A_{max} = g(\phi)$ in the two indicator zones 6.2 and 6.1 are indicated on screen 6 of FIG. 7.

During the astable switching state of the monostable multivibrator 41 the video amplifier 20 is dark-scanned via a blocking input 43. Thus a dark, circular separating zone 6.3 is obtained between the two indicator zones 6.1 and 6.2 on screen 6 of FIG. 7.

The two switching states of the bistable multivibrator 42 alternately actuate the generation of two variable threshold values $b_1$ and $b_2$ one for each indicator zone 6.1 and 6.2, by two separately adjustable threshold value generators 18a and 18b, respectively, in a brightness control circuit 11a. Thus, each one of the two scanning functions $A = g(\phi)$ and $A_{max} = g(\phi)$ can be provided with its threshold value. By means of two gating stages 44a and 44b controlled by the bistable multivibrator 42, the two threshold values $b_1$ and $b_2$ are fed, via a second switch contact 37' of switch 37 to the Schmitt trigger 19. In the Schmitt trigger 19, depending on the position of switch 37, the scanning functions $A = g(\phi)$ or $A_{max} = g(\phi)$ are compared with the threshold values $b_1$ or $b_2$ before the latter reach the video amplifier 20 and the AND gate 27.

In two reference value discriminators 24a, 24b a separate independently adjustable threshold is produced as a reference value for each scanning function $A = g(\phi)$ or $A_{max} = g(\phi)$ in the same manner as in the circuit of FIG. 5 which reference value is given through an OR gate 45 to AND gate 27 to give an alarm or to the video amplifier 20 to produce reference rings 28.1 and 28.2, respectively.

In the indication shown as the example in FIG. 7 the area between the scanning function $A = g(\phi)$ and the zero reference circle 5.2 is shown as a bright surface in the ring-shaped outer indicator zone 6.2 as in FIG. 4 and the scanning function $A_{max} = g(\phi)$ is shown as a spoke-type indication as in FIG. 3 in the inner indicator zone 6.1 with a zero circle 5.1. Both indicator zones 6.1 and 6.2 are clearly separated by a dark separation zone 6.3. In both indicator zones 6.1 and 6.2, FIG. 7 shows reference rings 28.1 and 28.2, respectively, which are so adjusted that the signal indications $s_{4max}$ or $s_4$, respectively, initiate an alarm.

In FIG. 7 the illustrated signal indications $s_i$ in the two indicator zones 6.1 and 6.2 relate to the angle of incidence $\phi_i$ so-to-speak as the dependent value $x$, as a parameter for the received signals $s_i$. The indication of FIG. 9 represents another combination of parameters in the indication in two separate indicator zones 6.1 and 6.2 of the screen 6. That is, the received signals $S_i$ are to be reproduced in a different manner, depending on their particular type, so that in the indicator zone 6.1 only received signals $S_i$ which have a pulse-shaped character are indicated whereas all the received signals $S_i$ are indicated in indicator zone 6.2. For the practical evaluation of the received signals $S_i$ such a differentiation in the indication is of great help. In the situation of FIG. 1, it is now assumed, for an indication according to FIG. 9, that the vessel 4 is provided with an active sonar ranging system. The observing vessel 1 receives a pulse-shaped signal $S_4$ which is reproduced in the indicator zone 6.1 as to its direction of incidence and amplitude. In FIG. 9 the representation is selected to be in the form of spokes; it is of course also possible to use a planar indication according to FIG. 4 in the case of pulse-shaped received signals $S_4$, as this is provided for in FIG. 9 in the indicator zone 6.2 as for indicating all of the received signals, i.e. those from the observing vessel 1, the accompanying vessel 3 and, of course, the further vessel 4.

Figure 11:
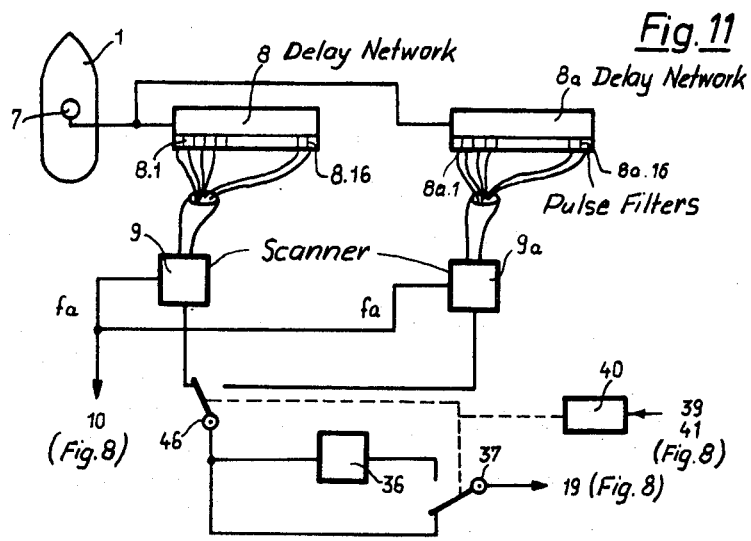
FIG. 11 illustrates a modification of the circuit of FIG. 8 in order to produce the indications of FIG. 9.

To produce an indication such as shown in FIG. 9, the previously described circuit of FIG. 8 is supplemented as shown in FIG. 11 by a second directionally selective network 8a with signal-preparing output stages 8a.1 to 8a.16 which is a known manner are so designed that they permit only pulse-shaped signals to pass. It is state of the art in electronic circuit design to compose an active or passive filter that only allows signals to pass if they are disappeared within certain range of time, e.g. using a gate that lets pass a shortly stored or retarded signal only if the original signal's duration is less than that preset range of time. A second interpolating scanner 9a which is operated with the same scanning frequency $f_a$ as scanner 9 prepares the pulse-shaped signals and transmits them to a switch 46 through which the maximum filter 36 (depending on the position of switch 37) is connected with the scanner 9a during the time when the electron beam is in the area of the indicator zone 6.1. Thus, during the duration of the unstable state of the monostable multivibrator 41 only pulse-shaped signals can cause a brightening of the electron beam, i.e. of indicator zone 6.1.

The obvious further modification of FIG. 11 by the addition of a filter circuit which blocks the pulse-shaped signals during the indication in indicator zone 6.2 is trivial and is, therefore, not shown in FIG. 11 in order to simplify the circuit diagram.

Contrary to the illustration of FIG. 7, the indication according to FIG. 9 contains only the signal $S_4$ as a signal indication $s_{4max}$ in the indicator zone 6.1 whereas it is assumed that the other received signals $S_1$, $S_2$, $S_3$ represent noise and not pulse-shaped signals. For the observer and evaluator of the indication on screen 6 the reproduction according to FIG. 9 is thus of substantially more informative character as regards circumstances of FIG. 1 without the clarity of the indication being in any way lessened.

In the previously described indications according to FIGS. 2, 3, 4, 7 and 9 the independent variable in the scanning function $A = g(x)$ was always the same characteristic of the received signals $S_i$, i.e. their direction of incidence $\phi_i$.

Figure 10:
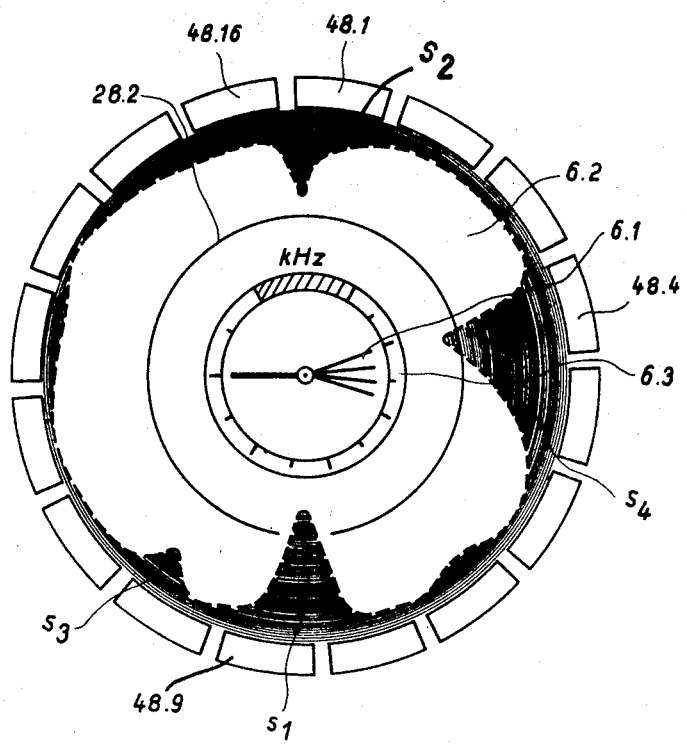
FIG. 10 shows an indication which is similar to that of FIG. 7, but gives an indication of different parameters for the received signals in different indicator zones.
Figure 12:
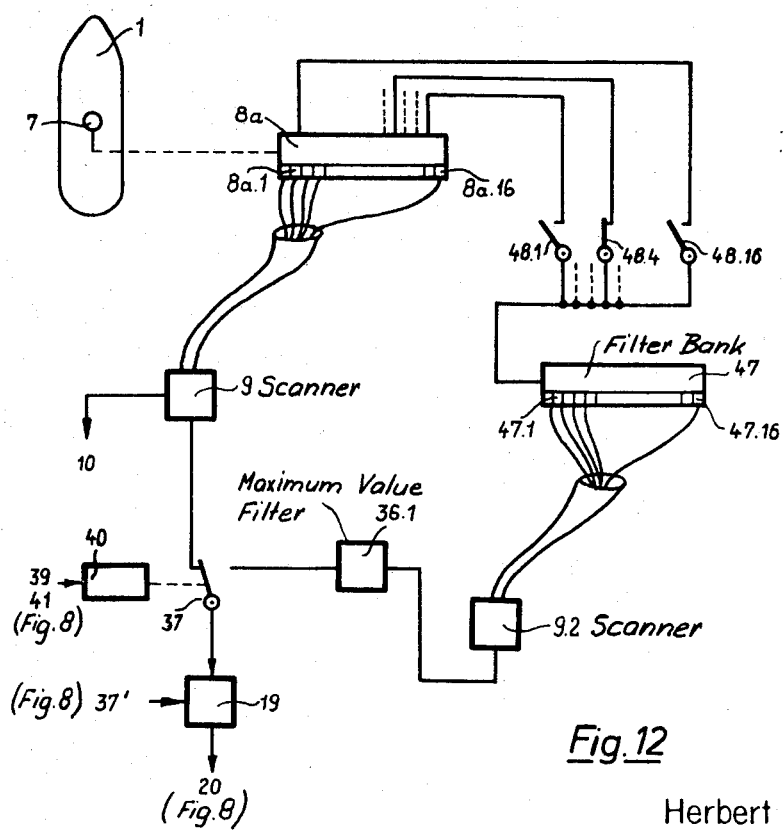
FIG. 12 shows a further modification of the circuit of FIG. 8 to produce an indication according to FIG. 10.

FIG. 10 shows a combination of indications in which scanning functions $A = g(x)$ for different parameters of the received signals $S_i$ are shown in indicator zones 6.1 and 6.2. That is, in the example of FIG. 10, the indicator zone 6.2 shows the indication of the received signals $S_i$ as regards signal intensity $A_i$ and direction of incidence $\phi_i$, as discussed in detail in connection with FIG. 4, and indicator zone 6.1 of the combination shown here shows as the parameter the frequency spectrum of a selected pulse-shaped received signal, in this case signal $S_4$. In a modification of the previously described circuit according to FIGS. 8 and 11, a filter bank 47 as shown in FIG. 12 is provided which can be selectively connected, via directional switches 48.1 to 48.16 directly to the preformed beams of the delay network 8a. To analyze the frequency $f$ of the incident signal $S_4$, the directional switch 48.4 is closed in the illustrated example. For an easier association of the direction $\phi$ and the directional switches 48.i, it is advisable to group these directional switches 48.i around the periphery of screen 6, for example, an indicated schematically by the narrow arc-shaped keys shown in FIG. 10. To produce the scanning function $A = g(f)$ for the received signal $S_4$ associated with the directional switch 48.4, it would be possible, in order to eliminate structural elements, to switch the scanner 9, via an appropriate time-dependent switch dependent on the output of Schmitt trigger 39, i.e. via the control device 40, time-dependently between the signal-preparing output stages 8a.1 of the delay network 8a or corresponding signal-preparing output stages 47.1 of the filter bank 47. In order not to make the circuit diagram of FIG. 12 too complicated, a further scanner 9.2 is provided which produces the scanning function $A = g(f)$ for the sector selected by directional switch 48.i. For the same reason of simplification this circuit variation for producing an indication according to FIG. 12 also provides a second maximum filter 36.1.

A circular frequency scale is provided for evaluation of the signal indication $s_i$ in the indicator zone 6.1 of FIG. 10 where, when compared with the indication of FIG. 9 or FIG. 7, the characteristic value, i.e. angle of incidence $\phi$, was replaced by frequency $f$. This scale can be advisably arranged in such a manner that a glass ring with an engraved frequency scale is disposed above the circular, dark, separating zone 6.3. Actuation of one of the directional switches 48.i laterally at the level of the plane of this engraved glass ring could then cause it to be illuminated. This results in the effect of a floodlight scale and, in the case of FIG. 10, it can be seen that the received pulse-shaped signal $S_4$ consists of a mixture of frequencies as well as one very distinct frequency. Since actuation of the direction switches 48.i does not adversely influence the indication in indicator zone 6.2, the observer of screen 6 has in front of him the entire environmental situation as shown, for example, in FIG. 4.

The described and illustrated embodiments and suitable variations represent only a small selection of useful possibilities of these advantageous novel forms of indication. The described means should be considered to be only exemplary, in particular the individual stages of the signal processing can be represented or supplemented by various circuits known for other purposes. The illustrations of FIGS. 5 and 8 comprise, for reasons of clarity, very obvious embodiments. In this sense, numerous variations of the described examples are possible within the scope of the present invention, for example, in line with the deflection of the electron beam of the electron tube 2 by changeover from a spiral-shaped raster to a circular raster which after each revolution suddenly increases its radius by a predetermined amount. For this purpose it is only necessary, in the simplest case, to connect the sawtooth generator 13 to a known scanning holding member which scans the sawtooth-shaped sweep voltage m at intervals which correspond to this enlargement of radius, i.e. feeds irregular voltage jumps into multiplier 14. It is, of course, also possible to deflect the electron beam from the edge of the screen 6 of the electron beam tube 2 toward the center.

It will be understood that the above description of the present invention is susceptible to various modifications, changes and adaptations, and the same are intended to be comprehended within the meaning and range of equivalents of the appended claims.

We claim:

1. In an apparatus for providing an indication of a scanning function $A = g(x)$ signal furnished by an electronic scanning means from received acoustical or electromagnetic signals, wherein $A$ is the signal intensity and the independent variable $x$ is a parameter of the received signal, on an indicating means in polar coordinates with an image frequency which produces still pictures, the improvement comprising:

a deflecting means synchronized with the scanning means for effecting both an angular and a radial deflection of the indicating means of said indicating device;

circuit means connected to the output of the scanning means and responsive to said scanning function signal, and synchronized with said deflecting means for causing said indicating means to provide an indication of the scanning function whose angular deflection is a function of the independent variable $x$ and whose radial deflection is a function of the signal intensity $A$; and, said circuit means having means for causing said signal intensities $A$ to be represented on said indicating means by distances inwardly extending from a reference circle on the image field of the polar coordinate indication, which circle is radially displaced from an origin of the polar coordinates, towards said origin.

2. The apparatus as defined in claim 1 wherein said indicating device is a cathode ray tube and wherein the output of said circuit means is connected to the brightness control circuit of the cathode ray tube to cause the electron beam thereof to be either on or blocked.

3. The apparatus as defined in claim 1 wherein said image field of the polar coordinate indication is divided into a plurality of concentric ring zones and wherein said circuit means includes means for causing signal indications representing different types of information to be associated with each of said ring zones.

4. The apparatus as defined in claim 3 wherein said scanning means provides at least a pair of different type scanning functions, e.g. the scanning functions $A = g(\phi)$ and $A = g(f)$, and wherein said circuit means causes each of said scanning functions to be indicated in a separate one of said ring zones.

5. The apparatus as defined in claim 3 wherein said circuit means causes a different type of indication of said scanning function to be provided in each of said ring zones.

6. The apparatus as defined in claim 1 wherein said circuit means is responsive to the output of said scanning means to cause said indicating device to indicate the curved path of the scanning function $A = g(x)$.

7. The apparatus as defined in claim 6 wherein said circuit means includes means for indicating the area between the curve path of the scanning function $A = g(x)$ and the reference circle whereby the ease of observing the curved path of the scanning function is improved.

8. The apparatus as defined in claim 1 including a maximum value filter connected between the output of said scanning means and the input of said circuit means, and wherein said circuit means includes means for controlling said indicating device to provide an indication of the maximum values of the scanning function $A_{max} = g(x)$ in the form of radial spokes ($s_{tmax}$).

9. The apparatus as defined in claim 1 wherein said deflecting means subjects said indicating means to an angular and radial deflection according to a given time program and wherein said circuit means includes means for providing an output signal to cause said indicating means to provide an indication when the signal intensity of the scanning function signal exceeds a given threshold value.

10. The apparatus defined in claim 9 wherein said circuit means includes a threshold value generating means which is synchronized with said deflecting means for providing a threshold value signal which is monotonically varied with the radial deflection of the indicating means.

11. The apparatus as defined in claim 9 wherein said deflecting means deflects said indicating means in a circular manner with continuously or step-wise variable radius.

12. The apparatus as defined in claim 10 wherein said threshold value generating means provides a non-linear threshold value signal, whereby a logarithmic indication of the signal intensity A may be provided.

13. The apparatus as defined in claim 1 including a mark generator means for producing at least one preferably adjustable reference ring in the image field of said polar coordinate indication whereby the signal intensity A may be more readily determined.

14. The apparatus as defined in claim 1 including means for providing an alarm signal when a given signal intensity threshold value is exceeded by the signal being indicated.

15. The apparatus as defined in claim 14 including a mark generator means for producing a reference ring in the image field of said polar coordinate indication which corresponds to the signal intensity threshold value at which an alarm is given.

16. The apparatus as defined in claim 14 wherein said alarm generating means includes means for preventing said alarm generating means from generating an alarm for signals occurring within preselected sectors of said polarcoordinate indication.

17. In an apparatus for providing an indication of a scanning function $A = g(x)$ signal furnished by an electronic scanning means received acoustical or electromagnetic signals, wherein $A$ is the signal intensity and the independent variable $x$ is a parameter of the received signal, on an indicating device in polar coordinates with an image frequency which produces still pictures, the improvement comprising:
  a deflecting means synchronized with the scanning means for effecting both an angular and a radial deflection of the indicating means of said indicating device;
  circuit means connected to the output of the scanning means and responsive to said scanning function signal, and synchronized with said deflecting means for causing said indicating means to provide an indication whose angular deflection is a function of the independent variable $x$ and whose radial deflection is a function of the signal intensity $A$ which are represented by distances extending from a reference circle on the image field;
  said scanning means providing a plurality of different scanning functions;
  said circuit means having means for providing a plurality of different type representations of the scanning functions on said indicator means; and
  a selector switch means for selectively determining the scanning function and/or representation of the selected scanning function to be indicated.

18. The apparatus as defined in claim 17 wherein said circuit means causes the signal intensities $A$ to be represented by distances from said reference circle extending outwardly from the origin of said polar coordinate indication.

19. The apparatus as defined in claim 17 including further selector switch means for providing a directionally selective switching on of scanning functions $A=g(f)$ of selected signals or sectors of the scanning functions $A = g(\phi)$ wherein $f$ is the frequency of the received signal and $\phi$ is the angle of incidence.

20. The apparatus as defined in claim 19 wherein said selector switch means includes separate selector switches provided for different sectors of the direction of incidence ($\phi$) of the signals scanned by said scanning means.

21. In an apparatus for providing an indication of a scanning function $A = g(x)$ signal derived from received acoustical or electromagnetic signals, wherein $A$ is the signal intensity and the independent variable $x$ is a parameter of the received signal, on an indicating device in polar coordinates with an image frequency which produces still pictures, the improvement comprising:
  scanning means for scanning the received signals, at a selected angle of incidence $\phi$ with respect to said independent variable $x$ to provide said scanning function;

a deflecting means synchronized with the scanning means for effecting both an angular and a radial deflection of the indicating means of said indicating device; and circuit means connected to the output of the scanning means and responsive to said scanning function signal, and synchronized with said deflecting means for causing said indicating means to provide an indication whose angular deflection is a function of the independent variable $x$ and the radial deflection is a function of the signal intensity $A$.

22. The apparatus as defined in claim 21, further comprising selector switch means for providing a directionally selective switching on of scanning functions $A = g(x)$, where $x$ is the frequency $f$, for selected angles of incidence $\phi$.

23. The apparatus as defined in claim 22 wherein said selector switch means includes separate selector switches provided for different sector of the angle of incidence $\phi$ of the signals scanned by said scanning means.

* * * * *